United States Patent
Thielert

(10) Patent No.: US 7,854,915 B2
(45) Date of Patent: Dec. 21, 2010

(54) METHOD OF PRODUCING SULFURIC ACID AND INSTALLATION FOR CARRYING OUT THE METHOD

(75) Inventor: Holger Thielert, Dortmund (DE)

(73) Assignee: Uhde GmbH, Dortmund (DE)

( * ) Notice: Subject to any disclaimer, the term of this patent is extended or adjusted under 35 U.S.C. 154(b) by 0 days.

(21) Appl. No.: 12/528,839

(22) PCT Filed: Mar. 20, 2008

(86) PCT No.: PCT/EP2008/002236

§ 371 (c)(1),
(2), (4) Date: Sep. 14, 2009

(87) PCT Pub. No.: WO2008/119474

PCT Pub. Date: Oct. 9, 2008

(65) Prior Publication Data
US 2010/0015035 A1    Jan. 21, 2010

(30) Foreign Application Priority Data
Mar. 29, 2007    (DE) ...................... 10 2007 015 137

(51) Int. Cl.
*B01J 12/00* (2006.01)
*C01B 17/69* (2006.01)
(52) U.S. Cl. ...................... 423/522; 423/563; 423/564; 422/129; 422/187
(58) Field of Classification Search ................ 423/522, 423/563, 564; 422/129, 187
See application file for complete search history.

(56) References Cited

U.S. PATENT DOCUMENTS

| | | | |
|---|---|---|---|
| 2,172,617 A | 9/1939 | Koolman et al. | ............... 23/175 |
| 2,992,884 A | 7/1961 | Bienstock | .............. 423/243.12 |
| 4,012,488 A * | 3/1977 | Brocoff | ................. 423/244.04 |
| 4,060,589 A | 11/1977 | Hass et al. | ............... 423/242.1 |
| 4,302,425 A | 11/1981 | Gamel | ......................... 422/161 |
| 4,919,912 A | 4/1990 | Taggart et al. | ........... 423/574.1 |

FOREIGN PATENT DOCUMENTS

| | | |
|---|---|---|
| DE | 2658208 | 6/1978 |
| GB | 1 344 471 | 1/1974 |
| GB | 1467083 | 3/1977 |

\* cited by examiner

*Primary Examiner*—Timothy C Vanoy
(74) *Attorney, Agent, or Firm*—Jonathan Myers

(57) ABSTRACT

The invention relates to a method of producing sulfuric acid wherein an $SO_2$-containing raw gas produced in a sulfuric-acid recovery plant is passed through at least one reactor in which a catalytic reaction of $SO_2$ to $SO_3$ takes place, and the $SO_3$ thereby formed is converted into sulfuric acid. According to the invention, at least a partial stream of the gas stream leaving the sulfuric-acid recovery plant is hydrogenated with an $H_2$-rich gas in a post-treatment stage. The $H_2S$-containing gas stream formed by the hydrogenation is fed into the $H_2S$ gas scrubber of a coke oven plant or a petrochemical plant. The invention also relates to an installation for carrying out the method.

9 Claims, 2 Drawing Sheets

METHOD OF PRODUCING SULFURIC ACID AND INSTALLATION FOR CARRYING OUT THE METHOD

CROSS REFERENCE TO RELATED APPLICATIONS

This application is the U.S. national phase of PCT application PCT/EP2008/002236, filed 20 Mar. 2008, published 9 Oct. 2008 as WO2008/119474, and claiming the priority of German patent application 102007015137.5 itself filed 29 Mar. 2007, whose entire disclosures are herewith incorporated by reference.

FIELD OF THE INVENTION

The present invention relates to a method of producing sulfuric acid wherein an $SO_2$-containing raw gas is produced in a sulfuric-acid recovery plant, the raw gas is fed through at least one reactor in which the $SO_2$ undergoes a catalytic reaction from $SO_2$ to $SO_3$, and the $SO_3$ thus formed is converted into sulfuric acid.

BACKGROUND OF THE INVENTION

The raw gas can be produced by combustion of catalytic conversion of hydrogen-sulfide-containing waste gases that accumulate, for example, during the purification of coke-oven gases. The raw gas mostly has an $SO_2$ content between 3 and 12% (v/v). The gas is usually cooled in a waste-heat boiler and optionally diluted with air to establish a superstoichiometric $O_2/SO_2$ ratio. The exothermic reaction of $SO_2$ to give $SO_3$ takes place over catalysts, e.g. $V_2O_5$ catalysts at temperatures between 400 and 650° C. The $SO_3$ hereby formed is cooled and absorbed in concentrated sulfuric acid in an absorber. In the known method, which is also designated as a contact method in the literature, $SO_2$ and $SO_3$ in the form of a sulfuric-acid mist occur as substantial emissions. The $SO_2$ emissions result from an incomplete conversion of $SO_2$ to $SO_3$.

Unconverted $SO_2$ is merely absorbed to a very small extent in the absorber. The $SO_2$ emission can be up to 3000 mg/Nm³ if suitable measures are not taken to reduce emissions.

Numerous measures for reducing $SO_2$ emissions are known. A high $O_2/SO_2$ ratio can thermodynamically promote the conversion of $SO_2$ at a generally lower temperature level. The use of a cesium-doped catalyst can improve the conversion and achieve lower $SO_2$ emissions. Finally, in order to improve the degree of conversion, the number of catalyst stages can be increased or an intermediate absorber can be provided before the last catalyst stage. However, in some cases, the operating costs of a sulfuric-acid recovery plant are increased significantly by the measures described. Furthermore, the measures are complex in terms of process technology and plant technology and are only suitable for retrofitting existing sulfuric-acid recovery plants to a limited extent. An overview of the known measures for reducing $SO_2$ emissions in a sulfuric-acid recovery plant is given in the publication of H. Wiesenberger "State of the art in sulfuric acid production," Monographs, Vol. 137 (2001), pages 7 to 23, ISBN 3-8557-583-1.

Gypsum suspension scrubbers are used to separate $SO_2$ in power plants, waste incineration plants and industrial installations where a high degree of separation is achieved. In coking plants or petrochemical plants having a downstream sulfuric-acid recovery plant, a gypsum-suspension scrubber is not generally available. The $SO_2$ emission cannot be introduced into the $H_2S$ scrubbers of a purification plant for coke-oven gas or corresponding gas scrubbers in a petrochemical plant since the salts produced interfere with the downstream stages of a conventional coke-gas purification system or corresponding equipment in a petrochemical plant.

German patent 26 58 208 discloses a method of eliminating sulfur oxides from a waste gas produced during the combustion of hydrocarbons in which sulfur oxides contained in the waste gas are reduced to hydrogen sulfide in a catalytic conversion zone. The hydrogen sulfide is extracted from the waste gas stream so that the purified waste gas stream only contains small quantities of sulfur.

It is known from U.S. Pat. No. 2,992,884 to reduce residual gases from sulfuric acid production with hydrogen.

In a method known from German patent document 21 66 916 [GB 1,344,471], waste gases are purified by catalytic hydrogenation of sulfur, the sulfur dioxide contained in the waste gases being converted into $H_2S$ using a stoichiometric quantity of hydrogen and into sulfur following absorption in an aqueous alkaline solution.

U.S. Pat. No. 4,919,912 describes a method in which a $SO_2$-containing gas stream is passed through a reaction zone in which a Claus reaction takes place and elemental sulfur is formed. Since the gas stream contains a superstoichiometric quantity of $SO_2$ for the Claus reaction, the waste gas from this Claus reaction is fed to a hydrogenation zone in which the excess $SO_2$ is converted into hydrogen sulfide. The hydrogen sulfide is extracted from the outflowing gas and fed back to the reaction zone and is available for producing sulfur with the Claus reaction.

OBJECT OF THE INVENTION

The object of the invention is to eliminate the $SO_2$ emissions that occur in a sulfuric-acid recovery plant as completely as possible. In particular, it should be possible to retrofit existing sulfuric-acid plants in coking operations and petrochemical plants by using the gas scrubbers available there. In the planning of new plants, the method should contribute toward being able to produce concentrated sulfuric acid having a high yield and energy efficiency.

SUMMARY OF THE INVENTION

The subject matter of the invention and the solution that attains this object is a method of producing sulfuric acid in which an $SO_2$-containing raw gas is produced in a sulfuric-acid recovery plant, the raw gas is passed through at least one reactor in which a catalytic reaction of $SO_2$ to $SO_3$ takes place, and the $SO_3$ thereby formed is converted into sulfuric acid, wherein, in order to reduce the $SO_2$ emission of the gas stream leaving the sulfuric-acid recovery plant, at least a partial stream of the $SO_2$-containing gas leaving the sulfuric-acid recovery plant is hydrogenated with an $H_2$-rich gas and the $H_2S$-containing gas stream formed by the hydrogenation is fed into a $H_2S$ gas scrubber of a coke-oven plant or a petrochemical plant. In the method according to the invention, the $H_2S$-containing gas stream is fed back to $H_2S$ gas scrubbers usually provided for gas purification in coking plants and in petrochemical plants. The method according to the invention is suitable for retrofitting existing sulfuric-acid recovery plants in coking operations and petrochemical plants and allows almost emission-free operation of the sulfuric-acid recovery plant with respect to gases.

If the sulfuric-acid recovery plant is part of a coking plant operation, coke-oven gas can be used for hydrogenating the $SO_2$ emission. Furthermore, it is also possible to recycle the $H_2S$-containing gas formed by hydrogenation back to the $H_2S$ gas scrubber of a purification plant for coke-oven gas.

The gas stream is preferably heated by heat exchange with the gas steam leaving the hydrogenating reactor before entering a hydrogenating reactor.

The $SO_2$-containing raw gas can be produced by combustion or catalytic conversion of hydrogen-sulfide containing gases that accumulate in particular during the purification of coke-oven gas. According to a preferred embodiment of the method according to the invention, the gas stream leaving the sulfuric-acid recovery plant with $SO_2$ emissions is divided into first and second partial streams, the first partial stream being recycled to the $SO_2$-containing raw gas and the second partial stream being fed to the previously described post-treatment stage and hydrogenated with $H_2$-rich gas. The sulfuric-acid yield can be improved by partially recycling the gas stream leaving the sulfuric-acid recovery plant back to the $SO_2$-containing raw gas stream. The partial recycling of the $SO_2$ emissions into the raw gas according to the invention has the further advantage that a lower degree of conversion of the catalytic reaction of $SO_2$ to $SO_3$ can be tolerated, specifically while maintaining good efficiency for the sulfuric-acid recovery. Furthermore, as a result of recycling part of the $SO_2$ emission back to the raw gas, a lower water content is established in the raw gas that promotes the concentration of the sulfuric acid and can be used to obtain a highly concentrated sulfuric acid.

A further advantageous embodiment of the method according to the invention provides that the $SO_2$-containing raw gas is produced by a two-stage combustion of hydrogen-sulfide-containing gases and that the first partial stream is fed to the raw gas before that of the second combustion stage. The $SO_3$ formed by the catalytic conversion of $SO_2$ is appropriately absorbed in an absorber in concentrated sulfuric acid.

The invention also relates to a plant for carrying out the method.

BRIEF DESCRIPTION OF THE DRAWINGS

The invention is explained hereinafter with reference to an illustrated embodiment. In the figures.

DETAILED DESCRIPTION OF THE DRAWINGS

Figure 1:
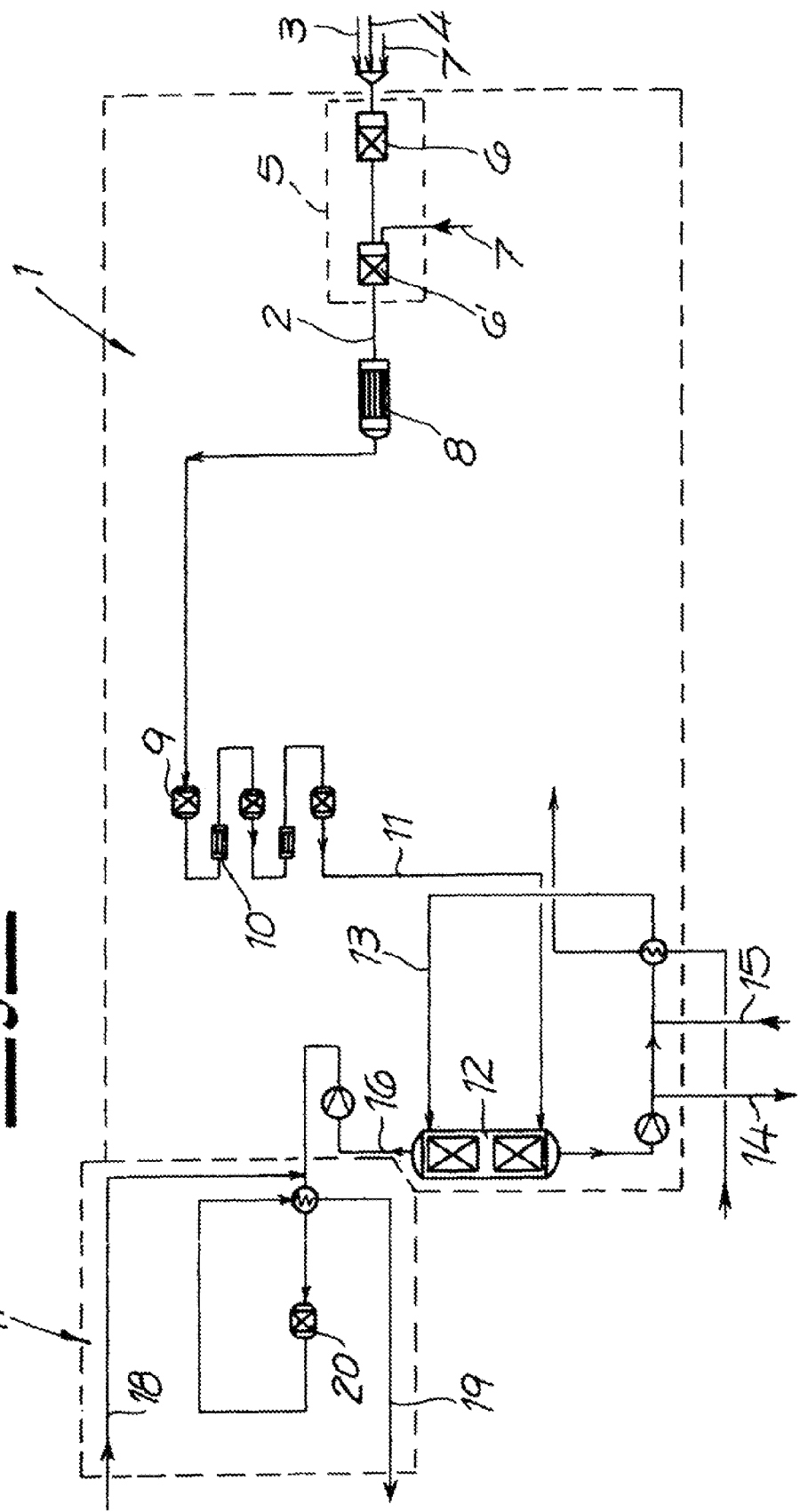
FIG. 1 is a flow chart of the method according to the invention.

A sulfuric-acid recovery plant 1 in which $SO_2$-containing raw gas 2 is initially produced is assumed. The $SO_2$-containing raw gas 2 is produced by superstoichiometric combustion of a hydrogen-sulfide-containing waste gas 3 that is fed to a combustion furnace 5 with an air stream 4 containing acidic gas components. In the illustrated embodiment, combustion is carried out in two successive combustion chambers 6 and 6' where the gas stream for establishing a superstoichiometric $O_2$/SO ratio is optionally diluted with air 7. The hot $SO_2$ raw gas 2 is cooled in a cooler 8 and fed to a plurality of reactors 9 connected in series, in which an exothermic catalytic reaction from $SO_2$ to $SO_3$ takes place, for example, with $V_2O_2$ catalysts. Between the stages the gases are cooled by heat exchangers 10 to the inlet temperature of the next catalytic stage. An $SO_3$-rich gas stream 11 is formed that is supplied to an absorber 12 operated with concentrated sulfuric acid. A liquid circuit 13 for the sulfuric acid is provided for the absorber 2. It is withdrawn from the bottom of the absorber 12, cooled and returned at the top. The $SO_2$ from the gas is absorbed in the concentrated sulfuric acid. A partial stream 14 of the sulfuric acid corresponding to the absorbed quantity is discharged as a product stream. Water 15 can be supplied to the liquid circuit to adjust the sulfuric-acid concentration.

The gas stream 16 leaving the absorber 12 contains $SO_2$ emissions. Depending on the design of the catalytic stages 9, levels can be up to 3000 mg/Nm³. The gas stream 16 leaving the sulfuric-acid recovery plant 1 with $SO_2$ emissions is hydrogenated in a post-treatment stage 17 with an $H_2$-rich gas 18 in the method shown in FIG. 1. The $H_2S$ gas stream 19 formed by the hydrogenation is returned to the scrubbing process of a coke oven plant or petrochemical plant not shown, located upstream of the sulfuric-acid recovery plant 1.

Coke-oven gas containing as its main components $H_2$, $CH_4$ and smaller quantities of CO, $C_NH_M$ and $CO_2$ is used for hydrogenating the $SO_2$ emission. The $H_2S$-containing gas 19 formed by hydrogenation is recycled to the $H_2S$ gas scrubber of a purification plant for coke-oven gas.

Before entering the hydrogenating reactor 20, the gas stream 16 is preheated by heat exchange with the gas stream leaving the hydrogenating reactor 20.

Figure 2:
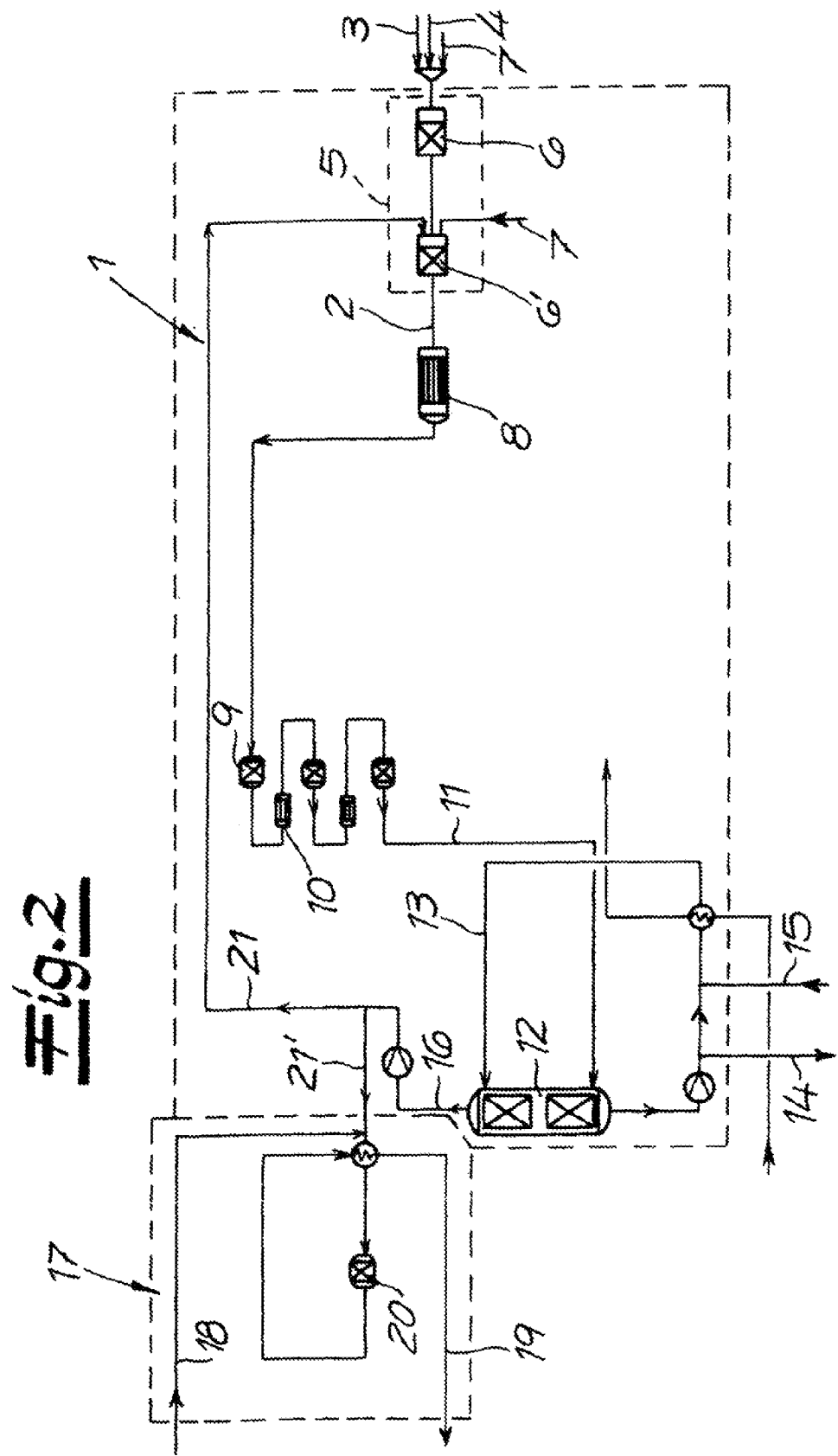
FIG. 2 shows the method of FIG. 1 with an additional partial return of the $SO_2$ emission into the $SO_2$-containing raw gas.

The method variant shown in FIG. 2 differs from the method shown in FIG. 1 in that the gas stream 16 leaving the sulfuric-acid recovery plant 1 with $SO_2$ emissions is divided into two partial streams 21 and 21', the first partial stream 21 being recycled to the $SO_2$-containing raw gas 2 and the second partial stream 21' being hydrogenated with the $H_2$-rich gas 18 in the post-treatment stage 17. In the illustrated embodiment according to a preferred embodiment of the invention, the $SO_2$-containing raw gas is produced by two-stage combustion of hydrogen-sulfide-containing gases and the first partial stream 21 is fed to the raw gas before the second combustion stage 6'.

The invention also relates to an installation for carrying out the method.

The invention claimed is:

1. A method of producing sulfuric acid wherein an $SO_2$-containing raw gas produced in a sulfuric-acid recovery plant is passed through at least one reactor in which a catalytic reaction of $SO_2$ to $SO_3$ takes place, and the $SO_3$ thereby formed is converted into sulfuric acid, and wherein in order to reduce the $SO_2$ emission of the gas stream leaving the sulfuric-acid recovery plant, at least a partial stream of the $SO_2$-containing gas leaving the sulfuric-acid recovery plant is hydrogenated with an $H_2$-rich gas and the $H_2S$-containing gas stream formed by the hydrogenation is fed into a $H_2S$ gas scrubber of a coke oven plant or a petrochemical plant.

2. The method according to claim 1 wherein coke-oven gas is used for hydrogenating the $SO_2$ emissions.

3. The method according to claim 1 wherein before entering into a hydrogenating reactor the gas stream is heated by heat exchange with the gas steam leaving the hydrogenating reactor.

4. The method according to claim 1 wherein the $SO_2$-containing raw gas is produced by combustion or catalytic conversion of hydrogen-sulfide containing gases that accumulate during the purification of coke-oven gas and that the gas stream leaving the sulfuric-acid recovery plant with $SO_2$ emissions is divided into first and second partial streams, the first partial stream being recycled back to the $SO_2$-containing raw gas and the second partial stream being fed to the post-treatment stage and hydrogenated with $H_2$-rich gas.

5. The method according to claim 4, wherein the $SO_2$-containing raw gas is produced by two-stage combustion of hydrogen-sulfide-containing gases and that the first partial stream is mixed with the raw gas before the second combustion stage.

6. The method according to claim 1 wherein the $SO_3$ formed by the catalytic conversion of $SO_2$ is absorbed in an absorber in concentrated sulfuric acid.

7. An installation for carrying out the method according to one of claim 1, the installation comprising:
- a sulfuric-acid recovery plant having at least one reactor for catalytic reaction of $SO_2$ to $SO_3$ and an absorber operated with sulfuric acid, and
- a post-treatment stage to which at least one partial stream of the gas stream leaving the sulfuric-acid recovery plant can be supplied, the post-treatment stage including a hydrogenating reactor supplied with an $H_2$-rich gas for hydrogenating the $SO_2$ emissions of the supplied gas stream, the $H_2S$-containing gas stream formed by the hydrogenation being fed to a gas scrubber connected to the post-treatment stage, the gas scrubber being a component of a purification plant for coke-oven gas.

8. The installation according to claim 7, wherein the post-treatment stage comprises a heat exchanger for preheating the gas stream before entering into the hydrogenating reactor by heat exchange with the gas stream leaving the hydrogenating reactor.

9. The installation according to claim 7 wherein the sulfuric-acid recovery plant comprises a combustion furnace in which an $SO_2$-containing raw gas is produced by combustion or catalytic conversion of hydrogen-sulfide containing gases and that a recycling device is provided that returns a partial stream of the gas stream leaving the sulfuric-acid recovery plant with an $SO_2$ emission to the $SO_2$-containing raw gas.

* * * * *